US012258933B2

(12) United States Patent
Haagenson

(10) Patent No.: US 12,258,933 B2
(45) Date of Patent: Mar. 25, 2025

(54) FLOATING BLADDER SYSTEM FOR PRODUCING ELECTRICAL ENERGY

(71) Applicant: Bernard Haagenson, Boulder Creek, CA (US)

(72) Inventor: Bernard Haagenson, Boulder Creek, CA (US)

( * ) Notice: Subject to any disclaimer, the term of this patent is extended or adjusted under 35 U.S.C. 154(b) by 0 days.

(21) Appl. No.: 18/143,024

(22) Filed: May 3, 2023

(65) Prior Publication Data

US 2024/0369036 A1 Nov. 7, 2024

(51) Int. Cl.
*F03B 17/00* (2006.01)
*F03B 11/00* (2006.01)
*F03B 17/02* (2006.01)

(52) U.S. Cl.
CPC .......... *F03B 17/025* (2013.01); *F03B 11/004* (2013.01); *F05B 2220/706* (2013.01); *F05B 2260/503* (2013.01)

(58) Field of Classification Search
CPC .................. F03B 17/025; F03B 11/004; F05B 2220/706; F05B 2260/503
See application file for complete search history.

(56) References Cited

U.S. PATENT DOCUMENTS

| | | | | |
|---|---|---|---|---|
| 3,961,479 | A | 6/1976 | Anderson | |
| 4,083,186 | A | 4/1978 | Jackson, Sr. | |
| 4,254,622 | A | 3/1981 | Denson, Sr. | |
| 4,674,281 | A | 6/1987 | Kim et al. | |
| 7,012,341 | B2 | 3/2006 | Mander | |
| 6,981,373 | B2 | 6/2006 | Robinson | |
| 8,011,182 | B2 | 9/2011 | Hastings | |
| 11,879,422 | B1 * | 1/2024 | Gill | F03B 17/025 |

* cited by examiner

*Primary Examiner* — Julio C. Gonzalez

(57) ABSTRACT

An electric power generating machine that uses buoyancy and gravity to put a plurality of refillable gas bladders into an alternating piston motion to drive and convert linear motion into rotational motion connected to an electric generator, which may contain a windmill.

20 Claims, 9 Drawing Sheets

FLOATING BLADDER SYSTEM FOR PRODUCING ELECTRICAL ENERGY

CROSS REFERENCE TO RELATED APPLICATIONS

This application claims the benefit of U.S. Provisional Patent Application No. 63/337,922, filed May 3, 2022, entitled "E.U.", the disclosure of which is incorporated by reference herein in its entirety.

BACKGROUND OF THE INVENTION

Using buoyancy and gravity in an attempt to generate electricity is not a new idea. However, the expenditure of energy into the system in order to generate energy from the system has historically reduced the net profit of energy, thus generally not making these machines commercially desirable.

What is needed is a method to reduce the amount of energy input into such a system in order to increase the net profit of energy.

SUMMARY OF THE INVENTION

It is therefore an object of the present invention to provide a fast, secure and convenient way for use of buoyancy and gravity to assist in energy input to increase net energy profit.

It is yet another object of the present invention is to overcome the limitations inherent in the various prior art of supplementing a gravity and buoyancy system with substantial energy input, thereby increasing the net energy return on the energy generation system, therefore making the invention commercially desirable.

DETAILED DESCRIPTION OF INVENTION

The invention will be further described in connection with the accompanying drawings, in which various facets and views of the invention are illustrated in order to assist in the understanding of the build, workings and methods used by the various embodiments of the invention.

There are many ways for this invention to be implemented—these drawings are the simplest and easiest to understand. For example, a square tank is used in these drawings so each side can be viewed with less confusion; however, the tank can be of any shape or size. On the other hand, the invention can function without a tank at all, but instead, it could be in an open body of water, such as a lake, sea or river, and hooked to a floating platform. It could have more bladders and more shafts. The pistons could be contained inside the tank instead of sticking outside the water. Furthermore, variants of additional embodiments are possible. This is why the preferred embodiment used in these drawings is one of the simplest and easiest to understand as well as implement while keeping the new and unique parts of this invention intact.

Figure 1A:
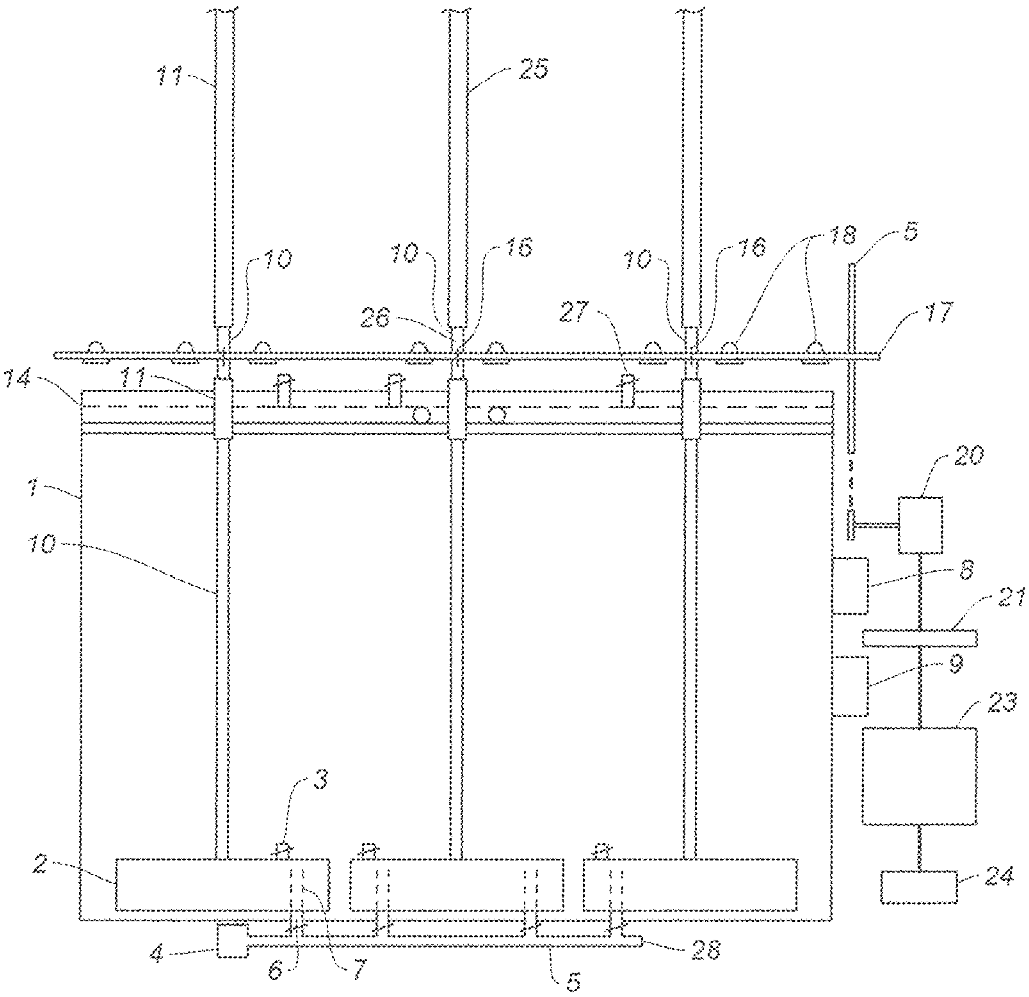
FIG. 1A shows an interior left side view.

Now looking at FIG. 1A, the preferred embodiment is comprised of a large square water tank (1) with three bladders (2) at the bottom of the tank. (1) All three bladders are the same—they have no bottoms and each has a short pipe with a valve (3) coming out of the top corner of the bladder. (2) This valve is in line and attached to with very short piece of pipe (27) that is just sticking out of the liquid and through the top of the tank (1). This short piece of pipe is attached to a pipe (28) for gas to travel through (herein sometimes referred to a "pipeline"). Each bladder (2) has a sensor to regulate the air pressure; in the event a bladder (2) is low on gas, the aerator (4), which is hooked to a manifold (36) located at or near the bottom of the tank (1) that is hooked up of a pipeline that goes to three holes in the tank and each go through a bulk head. Each of these three holes is lined up with one of the three bladders. (2) Just outside of the tank by each of these holes on the pipeline is a valve (6) that controls when to open or close to refill a bladder. (2) On the inside of the tank there is a pipe (7) that comes out of the bulkhead allowing the aerator to refill the correct bladder (2) as well as being filled to the proper level with gas.

The system is controlled by a computer (8) to automate all actions. In the preferred embodiment, the computer controls the valves, actuators and sensors through a series of timers, opening and closing valves based on times of actions as described herein. In the preferred embodiment, the computer controlling may comprise a readily available irrigation timer controller. All valves, actuators, aerator, and sensors have wire leading to a central harness at both the top and bottom of the tank. (1) They then go to the front of the water tank to the power supply (9) and/or the computer (wiring not in drawings). Additionally, the electric generator (20, charge controller (21), battery bank (23), and inverter (24) can be viewed by blocks on the turbine (5) (sometimes referred to as the "windmill" or "windmill head") side of the preferred embodiment.

Each bladder is permanently connected to a guide rod. (10) Each guide rod (10) has small holes on one side that allow it to fit in a gear. (16) The guide rod (10) is slidably connected to a housing. (11, 25) This housing is pivotably connected (13) to a steel tube (12) that may be welded in place across the top of the water tank just below the water line. (14) The guide rod (10) of each bladder assembly is gearably connected to a gear (16, 26) which is affixed to the axel shaft rod (17). The axel shaft rod (17) rests upon supports (sometimes referred to herein as “pillow blocks”). (18)

Figure 1B:
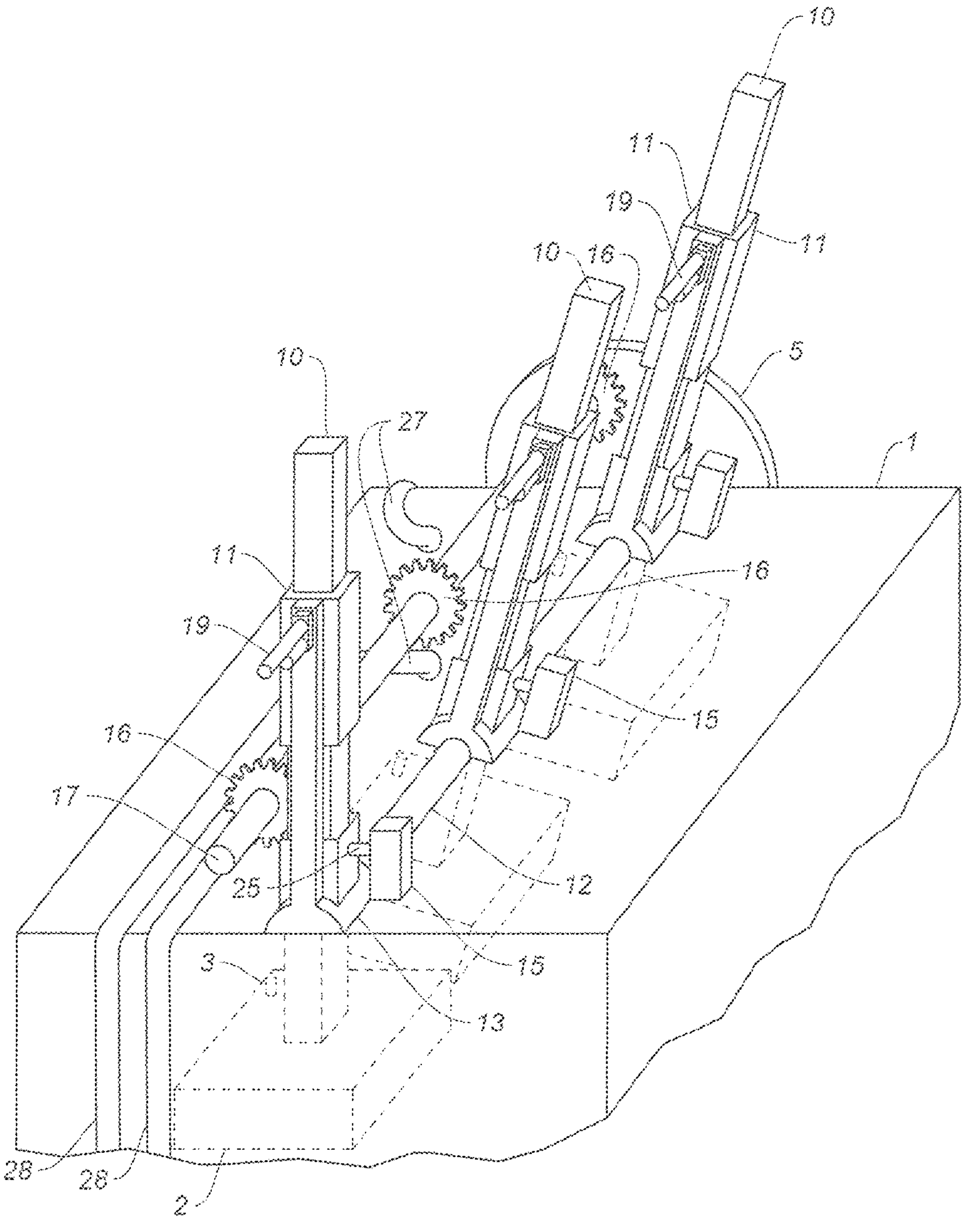
FIG. 1B shows a three-dimensional rendering of the preferred embodiment from above looking downward at an oblique angle with a guide rod in a vertical position and guide rod in a diagonal position with the connected bladder in a likewise position in order to release gas and disengage the gear.

Now turning to FIG. 1B, a three-dimensional rendering of the preferred embodiment can be seen, now showing one of the bladder assemblies, including the guide rod (10), guide rod housing (11), and bladder (2) tilted in a diagonal direction as described above to facilitate the release of the gas contained in the bladder (2) into a valve (3) and the short pipe (27) connected to the pipeline. (28) This oblique bird’s eye view of the preferred embodiment permits viewing a side of the embodiment on the opposite side of the gears (6) and axel shaft rod. (17). Specifically, the means for causing the orientation of the bladder assembly includes the pivot connection point (13), the steel tube (12) welded to steady the pivotable guide rod bladder assembly, as well as the actuator bladder system (15) that, by engaging and releasing the bladder assembly, is the means for the vertical and diagonal orientation of the guide rod bladder assembly. Finally, a locking actuator (19) to hold a guide rod (10) in place when a bladder (2) has reached the top of the tank (1) just under the waterline (14) can be seen.

Figure 1C:
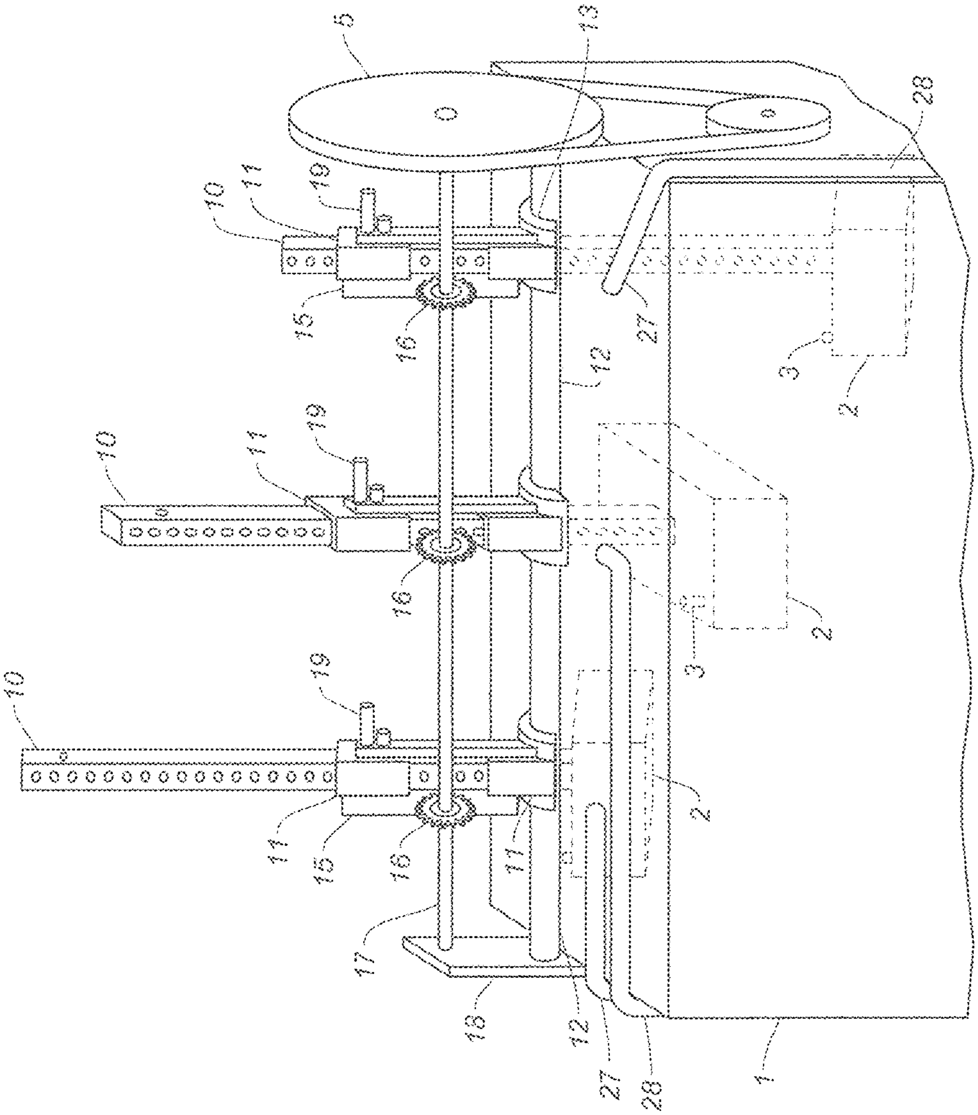
FIG. 1C shows a three-dimensional rendering of the preferred embodiment from the side and above looking downward at an oblique angle. One guide rod is in a diagonal position as in FIG. 1B, one guide rod in a vertical position with the bladder near the top portion of the tank, and the third guide rod is also in a diagonal position, but the bladder connected to this guide rod is near the bottom portion of the tank.

FIG. 1C is another three-dimensional rendering of the preferred embodiment from an oblique bird’s eye view but in a 90-degree rotation from FIG. 1B. Most of the same items can be seen in FIG. 1C as in FIG. 1B, but in this view it is easier to visualize the three bladders (2) of the preferred embodiment and their relationship to the entire bladder assembly. In this Figure, one bladder is near the bottom of the tank (1), one bladder is near the top portion of the tank, and the third bladder is in the diagonal position (as in FIG. 1B) to release the gas within the bladder, as described herein. Worthy of note in both FIGS. 1B and 1C, the gear (6) can be seen disengaged from the guide rod (10) in the diagonal position, thereby not inhibiting the movement of the axle shaft rod (17) and turbine (sometimes referred to herein as a “windmill head”). (5) This assists in the continuous unidirectional movement of the turbine (5) and thereby continuous force output.

Figure 2:
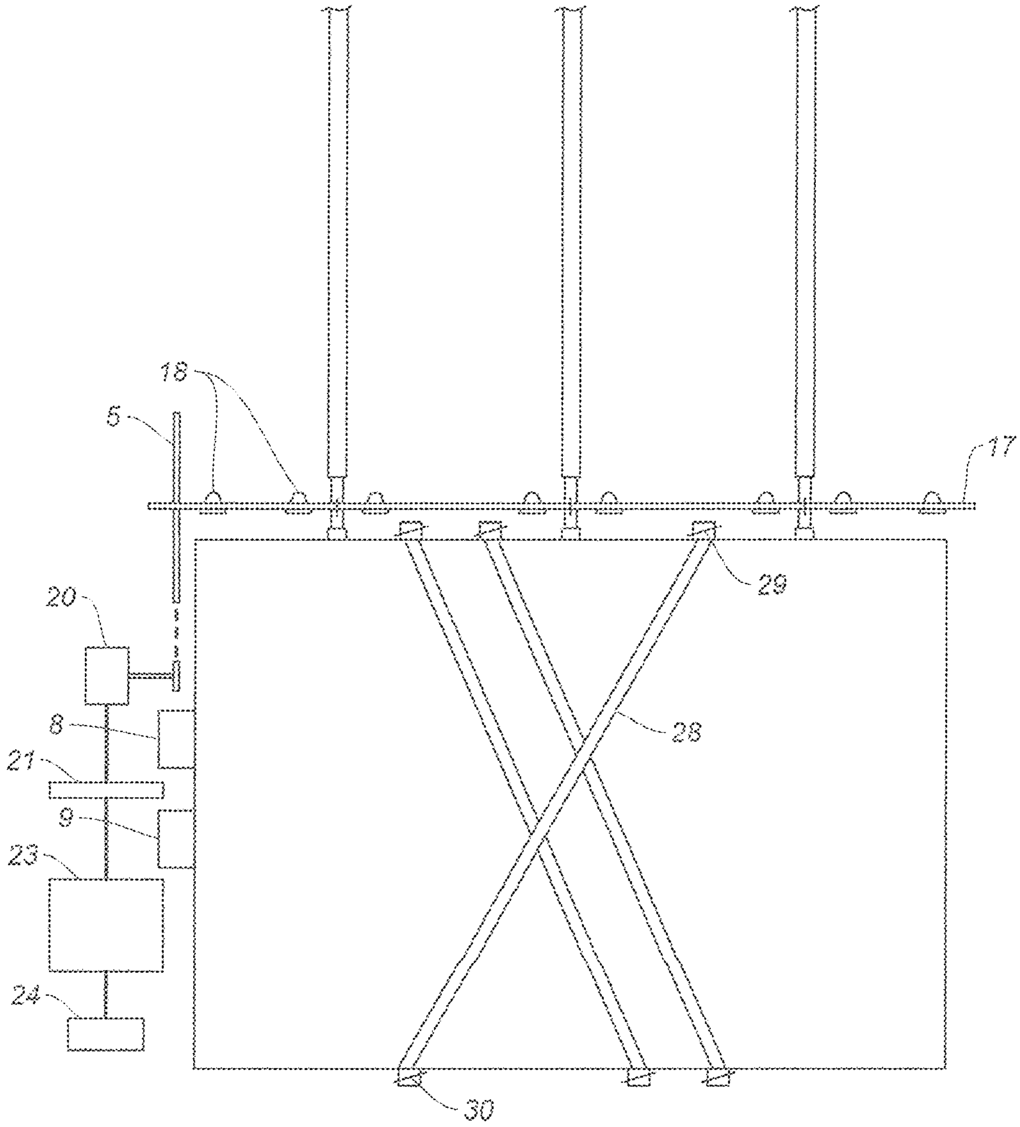
FIG. 2 shows an interior right side view.
Figure 3:
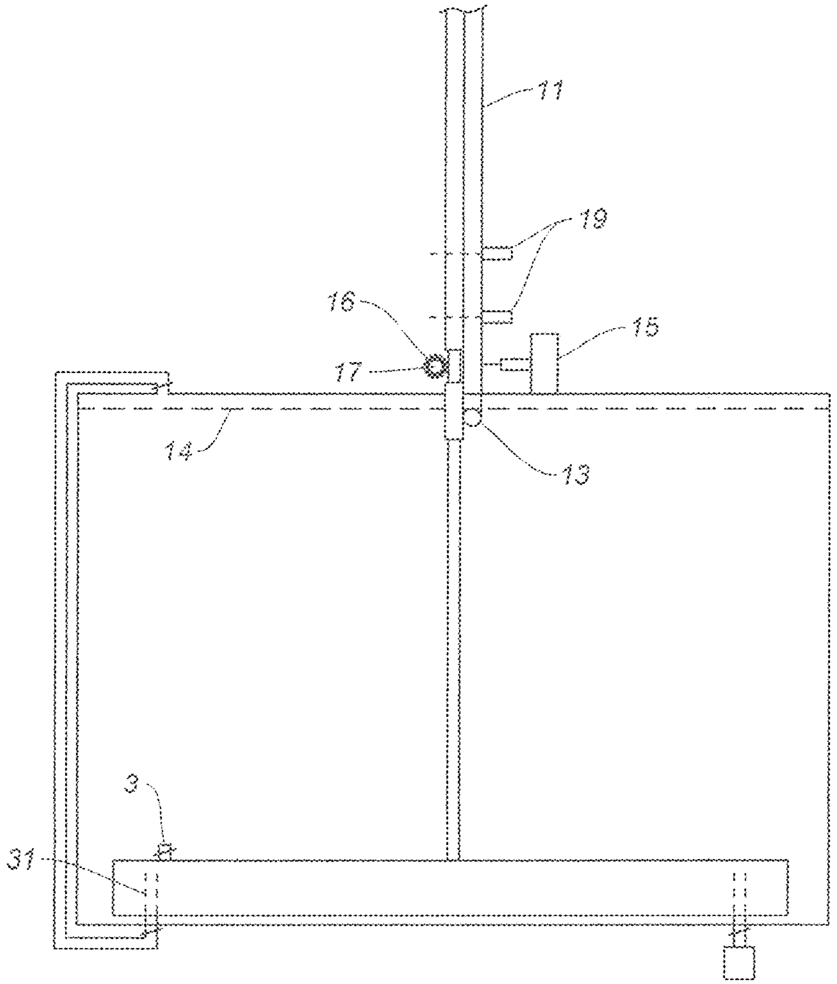
FIG. 3 shows an interior back side view with the guide rod assembly upright and gear engaged.

Now referring to FIGS. 2 and 3, each bladder and guide rod assembly (sometimes referred herein as a “bladder system”, “piston” or “guide rod assembly”) acts as a piston. Each bladder system is comprised of a bladder (2) with a valve on the top, a slidable guide rod (10), a housing (11) that is pivotably-connected (13), and three linear actuators (15) (19) contained above the tank that are connected to the housing (11) that is pivotably connected. One actuator (sometimes herein referred to as the “tilt actuator”) (15) moves the bladder system to and away from the gearing (16) that is on a shaft (sometimes herein referred to as a “generator shaft”) (17) with pillow blocks (18) that may be connected to the top of the tank (1) or connected to a walk-way or similar structure (not in drawings). The other two actuators (19) are used as locks to hold the pistons in place; one of these actuators is used to hold the piston near the top portion of the tank (herein sometimes referred to as the “upper tank bladder actuator”) and the other of these two actuators is used to hold the piston near the bottom portion of the tank (herein sometimes referred to as the “lower tank bladder actuator”). Having at least three bladder systems that are staggered in their linear motion in such a manner that at any one time one bladder system is expelling gas into another bladder system while the third bladder system is rising. Now we will go through a complete bladder system cycle.

Figure 4:
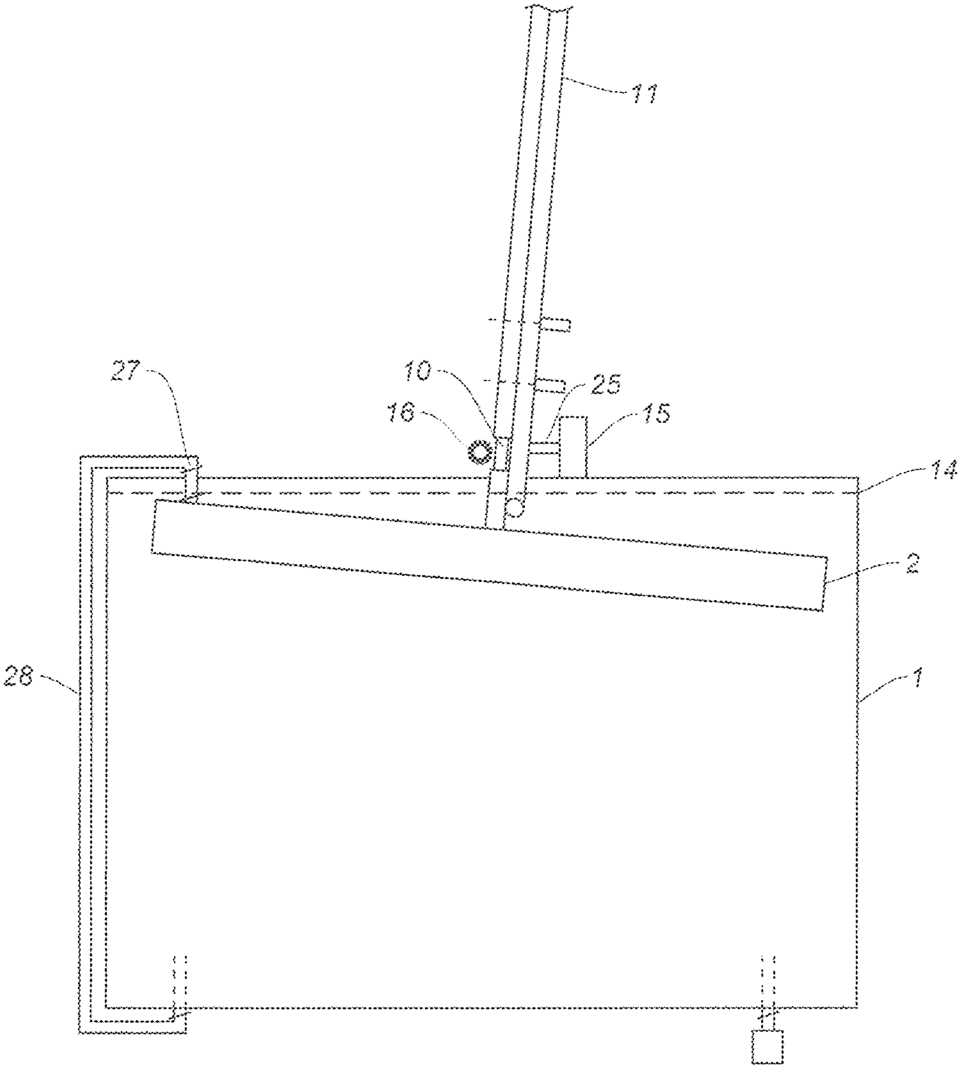
FIG. 4 shows an interior back side view with the guide rod assembly tilted and gear disengaged
Figure 5:
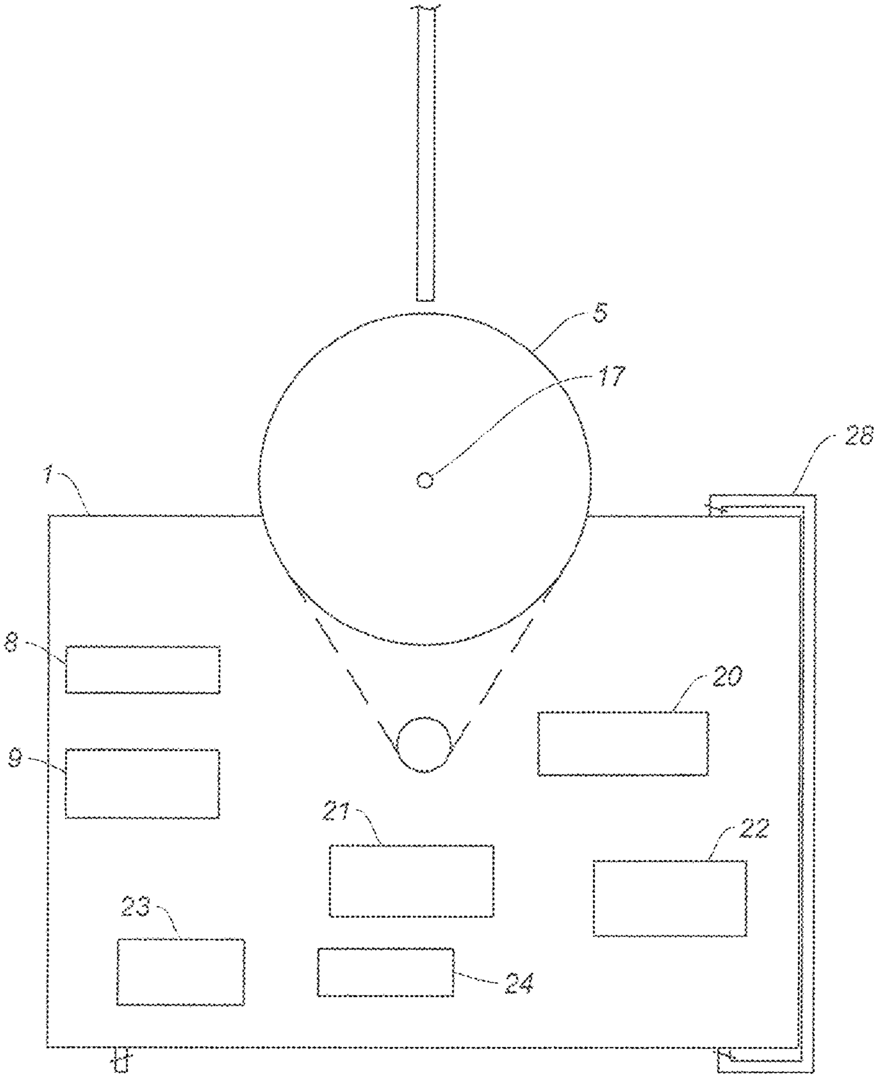
FIG. 5 shows an exterior front side view.

Now looking at FIGS. 4 and 5, and in order to start the electrical energy generation of the present intention preferred embodiment, the first step is turning on the computer. (8) When the computer is done doing a system check, it will display a start button. Press the start button—an actuator (15) opens and pushes a bladder system into a gear (16) on a shaft. (17) This shaft (17) is hooked to an electric generator (20) that, in the preferred embodiment, is connected to a windmill head. The electric generator (20) is connected to a charge controller (21) that is connected to either the grid through a grid inverter (22), or a battery bank (23) and inverter (24) for onsite use. Simultaneously, another actuator (19) that is being used as a lock to hold the guide rod (10) in place is closed and releases the guide rod (10) that is connected to a bladder (2) which is full of gas at or near the bottom of the tank (1) that then starts moving upward which spins the gear (16) on the shaft. (17) When the bladder (2) reaches the top of the tank (1) just below the liquid line (14), an actuator (19) closes which moves the bladder system away from the gear. (16) This puts the bladder system at a slight tilt (see FIG. 4). Simultaneously, another actuator (19) opens and locks the piston in place. Just as this is done, a second actuator (25) opens and pushes a second bladder system into a second gear (26) on the same shaft which starts the same process on the next bladder system. Referring back to the first bladder which is just below the liquid line (14) and slightly tilted (in FIG. 4), at the top of the bladder (2) is a very short piece of pipe with a valve (3) that is just sticking out of the liquid. (27) This lines up with a pipeline (28) that travels to the bottom of the tank (see FIG. 2). This line has two valves, one at the top end of the line (29) that butts up against the valve (27) on the bladder (2) that is just sticking out of the liquid, and a second valve (30) at the opposing end of the line at or near the bottom of the tank (1) just before it goes through a bulkhead into the tank. A length of pipe inside the tank (31) lines up with the next bladder (2) to be filled with gas. Simultaneously, the valve (3) on the top of the bladder (2) and the top valve (29) and bottom valve (30) on the return line open which allows the liquid in the tank to fill up the bladder (2) and pushes all the gas through the return line (28), filling up the next bladder (2) at or near the bottom of the tank. (1) When the bladder (2) is full of liquid, the top valve (29) and bottom valve (30) on the return line (30) close simultaneously; this keeps the gas return line (28) under pressure which results in very little gas loss, leaving the valve (3) on the bladder (2) open. Then the locked actuator (19) unlocks and releases the bladder (2) which is now full of liquid. The bladder (2) returns to the bottom of the tank. (1) Then the bladder valve (3) closes, thereby preventing any gas fill for the next cycle from escaping, and the locking actuator (19) locks the bladder system in place making it ready to be refilled with gas from another bladder system after it stops just below the liquid line (14) at the top of the tank.

Now looking at FIG. 6, a sample motion of the bladders can be viewed. The bladders (2) in this figure are generally rectangular without a side near the bottom portion of the tank. (35) In FIG. 6, the movement is seen in stages to illustrate the cycle of the bladders in rising, sinking, and the amount of gas and water in each bladder in each of the six cycle stages shown in FIGS. 6A through 6F. FIG. 6A additionally shows a simplistic illustration of the pipeline (28) that travels from the top portion of the tank (34) to the bottom of the tank (35) to transfer gas between the different bladders (2) as part of the cycle of the present invention. A bladder full of gas is illustrated by four circles in the bladder, the circles representing gas. A bladder full of liquid, here as water, is illustrated by small waves near the side of the bladder closest to the top portion of the tank. (34) Bladders partially filled with gas and partially filled with water, either filling with gas near the bottom portion of the tank (35) or filling with water (and therefore releasing gas) near the top portion of the tank (34), have only two bubbles and water waves (representing partially filled with water and partially filled with gas).

Figure 6A:
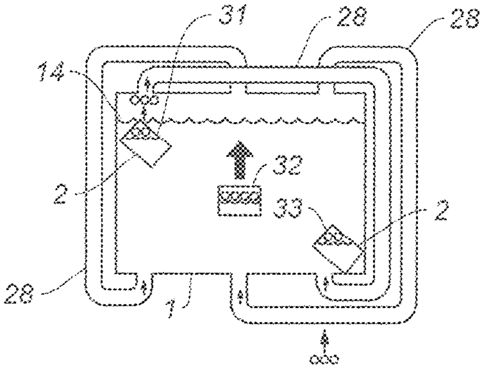
FIGS. 6A-6F shows an illustration of the cycle of bladders in six different stages of the complete cycle, demonstrating snap shots of various times of the cycle in order to show an example of the bladders rising and falling, filling and releasing gas, in order to generate the consistent motion for driving the axle generator shaft (not shown) and turbine (not shown) to generate power.

Now looking at FIG. 6A, three bladders (2) are seen in the tank. (1) The left bladder (31) at the left, the middle bladder (32) in the middle, and the right bladder (33) at the right. The left bladder (31) position is just below the waterline (14) releasing gas. As the left bladder is releasing gas, it is partially filled with gas and partially filled with water, as seen with partial waves and only two bubbles. The middle bladder (32) is rising, now filled with gas, as seen by the arrow indicating the direction towards the top portion of the tank (34) as well as by the four circles (bubbles) in the middle bladder. (32) The right bladder (33) is near the bottom portion of the tank (35) filling with gas, as indicated by only two bubbles and partially filled with water. The reader is to understand that, in this FIG. 6A, the air being released from the left bladder (31) is filling the right bladder (33) with air. In this embodiment, the bladders are without bottom sides, which permits the left bladder (31) just under the waterline (14) to fill with water as the gas is replaced with water because the air rises through the water towards the top portion of the tank (Archimedes' Principal). (34)

Figure 6B:
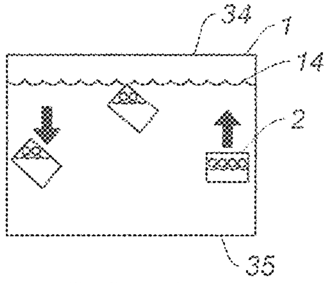

Now looking at FIG. 6B, the left bladder (31) is sinking now that it is filled with water. The arrow indicates that the left bladder (31) is sinking towards the bottom portion of the tank. (35) The middle bladder (32), filled with gas, has risen to the waterline (14). The right bladder (33), now also filled with gas, is now rising towards the top portion of the tank. (34) The reader should note that at any given time there are only eight air bubbles in total in all three bladders, intended to show that the amount of air in the system is constant and important for consistent motion and therefore power to the shaft (17) (not shown), the gears (16) (not shown), axle shaft (sometimes referred to herein as the "generator shaft") (17) (not shown), and turbine (5) (also not shown).

Figure 6C:
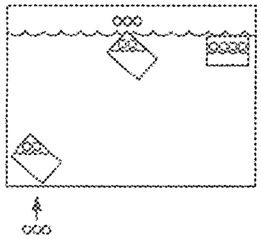

Now moving to FIG. 6C, the left bladder (31) has reached the bottom portion of the tank (35) and is being filled with gas from the movement of gas from the middle bladder (32), which is releasing gas near the water line. (14) The right bladder (33) has reached the top portion of the tank (34) and therefore the guide rod (10) has caused the gear (16) to spin, thereby again turning the shaft (17) and turbine (not shown). (5)

Figure 6D:
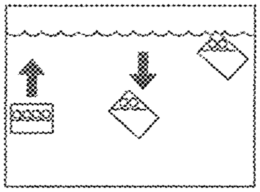

Now referring to FIG. 6D, the left bladder (31) has been filled with gas and is rising towards the top portion of the tank (34) as indicated by the arrow. The middle bladder (32), has completed releasing gas, which was channeled into the right bladder (31), is now sinking towards the bottom portion of the tank (35) as indicated by the arrow. The right bladder (33) is at the top portion of the tank (34) and is ready to begin releasing gas into the middle bladder (32) once it reaches the bottom portion of the tank. (35).

Figure 6E:
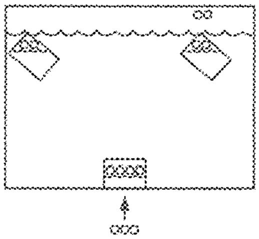

Now looking at FIG. 6E, the left bladder (31) has reached the top portion of the tank (34) and the middle bladder (32) has sunk to the bottom portion of the tank. (35) As shown by the partial fill of water and bubbles of the right bladder (33), the right bladder (33) is in the process of releasing air into the pipeline (28, not shown) to partially fill the middle bladder (32) with gas.

Figure 6F:
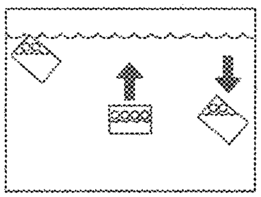

Finally, looking at FIG. 6F, the left bladder (31) is at the top portion of the tank (34) and is ready to begin releasing gas into the left bladder (33) once it reaches the bottom portion of the tank. (35) The left bladder (33) is sinking towards the bottom portion of the tank (35), as shown by the arrow, now that the right bladder (33) is filled with water. The middle bladder (32), now filled with air, is rising towards the top portion of the tank (34), as shown by the arrow.

The cycle now begins again, as we would again look to FIG. 6A to see the next step after FIG. 6F, where the left bladder (31) is releasing gas into the left bladder (33) while the middle bladder (32) is still rising towards the top portion of the tank (34), still filled with gas.

Figure 7A:
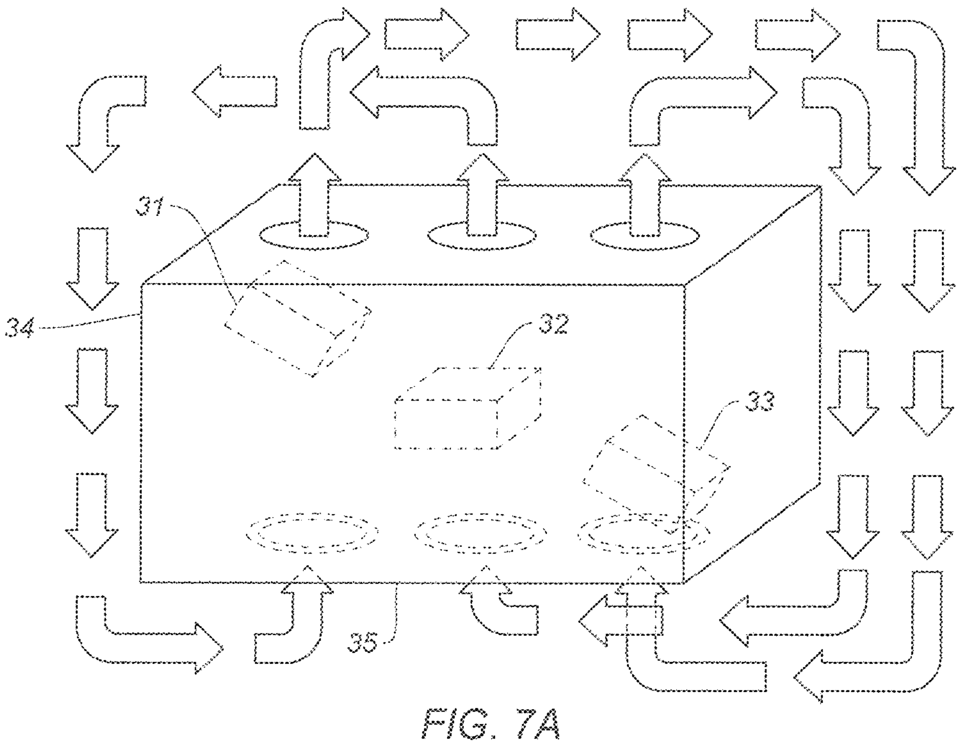
FIG. 7A illustrates the movement of gas as the bladders release the gas.
Figure 7B:
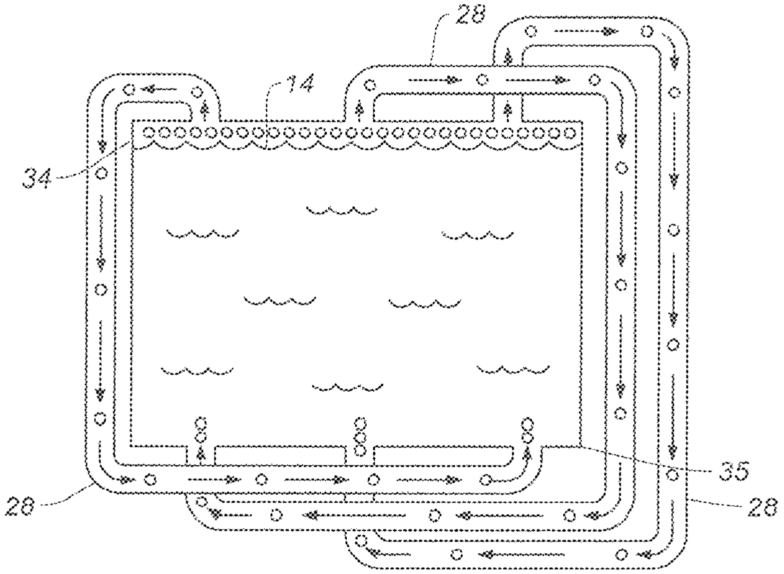
FIG. 7B also shows the movement of gas through rudimentary pipelines as the bladders release the gas to demonstrate that as one bladder releases gas in this closed system, the released gas is directed to another bladder by use of the system of valves (not shown) according to the timing of the rise and fall of bladders.

Now referring to FIGS. 7A and 7B, the movement of gas is illustrated by arrows showing the movement of gas from the top portion of the tank (34) towards the bottom portion of the tank (35) through the pipeline. (28, not shown) FIG. 7A shows the bladders (2), with the left bladder (31) releasing gas, the middle bladder (32) rising towards the top portion of the tank (34), and the right bladder (33) at the bottom portion of the tank (35), being filled with the gas that was in the left bladder (31). Similarly, FIG. 7B shows the pipeline (28) in a simple illustration to show the flow of gas, indicated by arrows for direction and bubbles for illustration of gas. The waterline (14) is shown by small waves.

As a review, the preferred embodiment of the invention is an electric power generator equipment that has preferably three floatable bladders (sometimes herein simply referred to as a "bladder") members positioned planarly adjacent to one another inside of a water tank member. The water tank member has a bottom, and lower portion above the bottom, sides, top, and an upper portion below the top. The floatable bladders have a top and sides, but no bottom. Although the pictures show the floatable bladders, and even the tank, as squares and rectangles, these bladders and tank can be of any shape. In fact, in one embodiment, the invention can be installed in a river, lake or other open body of water where the tank is merely a frame. In the preferred embodiment, the majority of the water tank member is filled with liquid but airspace remains at the very top portion of the water tank member.

The top of each bladder has a short pipe that extends from the top of the bladder upwards and contains a valve and sensor connected to the short pipe. In the preferred embodiment, a guide rod is permanently connected to the top part of each bladder and extends upwards and through the top part of the water tank where it is can slide up and down in a piston motion as well as tilt back and forth. Each of these three guide rods are held in place by a housing that is positioned above, and not touching, the water tank as well as a guide rod tube that holds the guide rods in place at the top of the water tank, both above and below the top of the water tank. Both of these guide rod housings are designed to retain the guide rod so that the guide rod can slide up and down within the housings in a piston motion. Each guide rod therefore has a guide rod housing and a guide rod tube housing. Additionally, the guide rod and the two corresponding housings for the guide rod have a support member that the guide rod housings are connected to a support member (cumulatively sometimes herein called a "guide rod assembly" for short). This is clearly visible in the drawings. In order to harness the energy of the guide rod piston movement, the guide rod has holes in it (gear rack), that are exposed between the guide rod housing and the guide rod tube housing because the holes are on the other side of the gear rod than the support member. The holes correspond with the teeth of a gear. Each guide rod assembly can pivot back and forth so that the guide rod gear rack can mesh with the gear and disengage from the gear as it is pivoted; in other words, the guide rod assembly is pushed into the gear and then moved away from the gear by pivoting the guide rod assembly.

The guide rod assembly is tilted by an actuator, and with three guide rod assemblies in the preferred embodiment there are three tilt actuators. Each tilt actuator is connected to or near the top of the water tank member and positioned so that when the actuator, such as a solenoid, is activated and deactivated, it functions the tilt the guide rod assembly (through the support member). The guide rod gear rack is therefore moved, by tilt, either into a meshing position with the gear or away from, and thereby disengaged, from the gear. As the guide rod moves up, the gear and gear rack are engaged, and when the rod moves down, the gear and gear rack are disengaged by the tilt of the guide rod assembly as a result of the actuators. In another embodiment, the gear and gear rack holes are replaced with another gear assembly, such as a rack and pinion assembly.

As described above, the bladders filling and exhausting gas, rising and sinking in the tank, are controlled in an alternating fashion, in part by upper tank bladder actuators and lower tank bladder actuators. Specifically, when a bladder reaches the top of the tank, an upper tank bladder actuator locks the guide rod in place and retains the bladder near the upper portion of the tank until the time is right for the bladder to fill with liquid and descend in the tank. Likewise, when a bladder reaches the bottom of the tank, a lower tank bladder actuator locks the guide rod in place and retains the bladder near the lower portion of the tank until the time is right for the bladder to fill with gas and ascend in the tank. Each floatable bladder has a sensor to monitor the gas pressure and volume. Both the upper tank bladder actuators and the lower tank bladder actuators are positioned above the tilt actuator and are connected to the corresponding support member of that guide rod assembly. A power source is connected to all of the different actuators.

The gas from the bladders moves from bladder to bladder through a manifold that has a bottom portion (near the bottom of the water tank), a side portion (near the side portion of the water tank) and a top portion (near that top portion of the water tank) and is attached to the water tank. The manifold bottom portion is attached to three bottom bulkhead valves that are attached to the water tank member bottom and each bottom bulkhead valve is positioned and aligned under a corresponding floatable bladder member. Each bottom bulkhead valve has a sensor and has a means that can open or close the valve at the correct time to fill a specified bladder with gas. In another embodiment, each bottom bulkhead valve has a pipe connected for directing gas to fill each floatable bladder corresponding to each bottom bulkhead valve.

Additionally, the manifold side member attached the bottom portion of the manifold to the top portion of the manifold, thereby spanning a water tank member side. The manifold top portion also has three top bulkhead valves that are attached at the top portion of the water tank member and have a sensor, power supply and means to control the opening and closing of the valve to allow the expulsion of gas from the bladder. The top bulkhead valve corresponds to the small pipe that extends from the top of a bladder and is engaged when the guide rod assembly, and therefore a bladder, is tilted into a position where the pipe and top bulkhead valve correspond. In another embodiment, each top bulkhead valve has a pipe connected for directing gas to escape each floatable bladder corresponding to each top bulkhead valve in order for the floatable bladder to fill with liquid and sink to the water tank member lower portion. Also, sometimes more gas or liquid may be needed the system, and an aerator valve sensor is attached to the manifold and attached to an aerator for inserting gas into the manifold and a liquid filling pipe is connected to the water tank member for infusing additional liquid as needed.

A wire harness assembly (containing connecting wires as well as a harness) is connected to each floatable bladder pipe valve sensor, each tilt actuators, each upper tank bladder actuators, each lower tank bladder actuators, each floatable bladder sensors, each bottom bulkhead valve sensors, each top bulkhead valve sensors, and each aerator valve sensor as well as a computer to automate all actions of the preferred embodiment of the invention as well as supply power to each of the valves and sensors and activators and aerator and liquid filling pipe control.

In order to harness the energy produced by the preferred embodiment, a generator shaft is connected to each gear such that as the gear turns, the generator shaft is turned as well. One end of the generator shaft is also connected to an electric generator for converting rotational mechanical power into electrical power. Specifically, the floatable bladders are staggered in their linear motion such that when one floatable bladder is expelling gas in the water tank member upper portion, another said floatable bladder is rising and another said floatable bladder is filling with gas in said water tank member lower portion, creating a continuous (or near continuous) turning of a gear and thus turning of the generator shaft. A windmill head and assembly may also be attached to the electric generator for additional electrical power. The electric generator can be connected to battery bank, electric circuit or circuit panel in order to use the generated electrical energy.

In alternative embodiments, the number of floatable bladders can more or less than three. In another embodiment, the manifold and bulkheads are all located inside of the water tank member.

Likewise, in another alternative embodiment, the guide rods, guide rod housings, guide rod housing supports, guide rod tube housings, tilt actuators, lower tank bladder actuators, upper tank bladder actuators, top bulkhead valves, and bottom bulkhead valves are all contained within the water tank member. In still another embodiment, and in addition to the foregoing, when the guide rod is contained completely with the water tank member, the gears cannot be connected to the generator shaft but must be connected to a different support structure. This involves the gears within the water tank member being connected to a flat belt, v belt, chain drive or cable to transmit the linear energy up through and above the water tank member and thereupon attached to a second set of gears attached to the generator shaft and another support member.

Although in the preferred embodiment, air and water are used, but the system is not limited to air and water, as other liquids can replace water and other gasses can replace air. For example, any inert gas can be used, such as a noble gas or nitrogen.

Upon reading this disclosure, those of skill in the art will appreciate still additional alternative structural and function designs for a using inflatable and deflatable air bladders (air boxes) with conservation of gas in a closed gas system in order to cause the buoyancy to drive an electric generator and turbine as well as using gravity to drive the liquid filled air bladders to the bottom of the tank and displacement to drive the gas into the next air bladder (air box). Thus, while particular embodiments and applications have been illustrated and described, it is to be understood that the disclosed embodiments are not limited to the precise construction and components disclosed herein. Additionally, variants of additional embodiments are possible. Therefore, the spirit and scope of the appended claims and the concepts taught herein should not be limited to the description of the preferred embodiments and embodiments contained herein.

For example, several different embodiments may include each part being a different size and/or shape and/or material; use of various types of generators; a multitude of return lines and air boxes in any size and/or shape and/or material; return lines and aerator manifold can be located anywhere inside or outside the tank; use of gases other than air and other liquids other than water; and, instead of a piston coming up out of the water in the tank, the piston can be hooked to the bottom of the tank and use a flat belt, v belt, chain drive, or cable to achieve the same results.

I claim:

1. An electric power generator equipment comprising a water tank member with a bottom, sides, top, and said water tank having an upper portion including and below said top and an opposing lower portion including and above said bottom;

three floatable bladder members positioned planarly adjacent to one another inside of said water tank member;

said floatable bladder members having a top portion connected to side portions but without any bottom portion;

said top portion of each said floatable bladder member having a short pipe extending away from said floatable bladder top portion;

said short pipe having a valve and a sensor;

a guide rod permanently connected to each said floatable bladder top portion and extending generally upward and slideably and pivotably connected through said top of said water tank;

three guide rod housings pivotably connected to a support member above said water tank and slidably containing said guide rods;

three guide rod tube housings positioned in said water tank member top slideably and pivotably retaining each said guide rod through said water tank member top and connected to a said support member;

said three housing support members each connected to one said guide rod housing and one said guide rod tube housing and leaving a portion of the guide rod exposed between said guide rod housing and said guide rod tube housing;

said guide rods containing holes of gear rack opposite of said corresponding guide rod housing supports;

three gears connected to said water tank member top, each positioned between and one said guide rod housing and said guide rod tube housing, opposite of said guide rod housing support such that each of said gears gearingly mesh with a corresponding said guide rod gear rack;

three tilt actuators, each connected to said water tank member top positioned so that when activated, said tilt actuator pushes and tilts one said guide rod housing support such that a said gear rack teeth gearingly engage to a said gear and when deactivated said gear rack holes gearingly disengage to a said gear;

three upper tank bladder actuators positioned above said tilt actuators and connected to a support member positioned so that when activated, said upper tank bladder actuator keeps one said guide rod and said floatable bladder member attached to said guide rod at the upper portion of said tank;

three lower tank bladder actuators positioned above said tilt actuators and connected to a support member positioned so that when activated, said lower tank bladder actuator keeps one said guide rod and its said floatable bladder member at the lower portion of said tank;

a power source connected to said actuators;

each said floatable bladder containing a sensor to monitor the gas pressure and volume of said floatable bladder;

a manifold with a bottom portion, a side portion and a top portion attached to said water tank member top, side and bottom;

said manifold bottom portion spanning said water tank bottom, having three bottom bulkhead valves attached to said water tank member bottom and aligned under said floatable bladder members such that each said bottom bulkhead valve corresponds and is positioned under a said floatable bladder;

each said bottom bulkhead valve having a sensor and means to open and close said bottom bulkhead valve;

said manifold said manifold side portion extending from said manifold bottom portion to said manifold top portion traversing said water tank member side;

said manifold top portion having three top bulkhead valves attached to said water tank member top, spanning said water tank top and each said top bulkhead valve positioned above a said floatable bladder pipe member such that each said top bulkhead valve corresponds and is positioned above a corresponding said floatable bladder pipe;

each said top bulkhead valve having a sensor and means to open and close said top bulkhead valve;

an aerator with a valve and aerator valve sensor attached to said manifold for inserting gas into the manifold;

a wire harness assembly connecting to each said floatable bladder pipe valve sensor, said tilt actuators, said upper tank bladder actuators, said lower tank bladder actuators, said floatable bladder sensors, said bottom bulkhead valve sensors, said top bulkhead valve sensors, and said aerator valve sensor;

a computer connected to said wire harness assembly for automating all actions of said valves, actuators, sensors and aerator;

a generator shaft connected to each said gear and an electric generator, said electric generator converting rotational mechanical power of said gears into electrical power, wherein:

a means for staggered movement of said floatable bladders wherein when one floatable bladder is expelling gas in said water tank member upper portion, another said floatable bladder is rising and another said floatable bladder is filling with gas in said water tank member lower portion.

2. The electric power generator equipment of claim 1 wherein each actuator contains a solenoid.

3. The electric power generator equipment of claim 1 wherein said guide rod gear rack and said gear pinion to convert linear motion to rotational motion.

4. The electric power generator equipment of claim 1 wherein each said bottom bulkhead valve has a pipe connected for directing gas to fill each said floatable bladder corresponding to each said bottom bulkhead valve.

5. The electric power generator equipment of claim 1 wherein each said top bulkhead valve has a pipe connected for directing gas to escape each said floatable bladder corresponding to each said top bulkhead valve in order for said floatable bladder to fill with liquid and sink to said water tank member lower portion.

6. The electric power generator equipment of claim 1 wherein said electric generator is connected to one of the group consisting essentially of battery bank, electric circuit and circuit panel.

7. The electric power generator equipment of claim 1 wherein the number of said floatable bladders comprises at least three floatable bladders.

8. The electric power generator equipment of claim 1 wherein said water tank member is a frame for use in open water.

9. The electric power generator equipment of claim 1 wherein a windmill assembly is attached to said electric generator.

10. The electric power generator equipment of claim 1 wherein a liquid filling pipe is connected to said water tank member.

11. The electric power generator equipment of claim 1 wherein said tank is partially filled with a liquid.

12. The electric power generator equipment of claim 1 wherein said manifold and said bulkhead valves are located within said water tank member.

13. The electric power generator equipment of claim 1 wherein said floatable bladders, said manifold and a portion of said water tank member are filled with gas.

14. The electric power generator equipment of claim 13 wherein said gas is an inert gas.

15. The electric power generator equipment of claim 13 wherein each said top bulkhead valve associated with one said floatable bladder is attached to a said bottom bulkhead valve associated with a different said floatable bladder so that when said first said floatable bladder expels gas, the expelled gas fills the other said different floatable bladder.

16. The electric power generator equipment of claim 1 wherein said guide rods, said guide rod housings, said guide rod housing supports, said guide rod tube housings, said tilt actuators, said lower tank bladder actuators, said upper tank bladder actuators, said top bulkhead valves, and said bottom bulkhead valves are enclosed within said water tank member.

17. The electric power generator equipment of claim 16, wherein said gears are connected to a support structure that is not said generator shaft.

18. The electric power generator equipment of claim 17, wherein a second set of gears are attached to a support member and located outside and above said water tank member.

19. The electric power generator equipment of claim 18, wherein said gears are connected to said second set of gears by a member selected from the group consisting essentially of flat belts, v belts, chain drives and cables.

20. The electric power generator equipment of claim 19, wherein said gears are connected to said generator shaft.

* * * * *